US007545073B2

(12) United States Patent
Lewis et al.

(10) Patent No.: US 7,545,073 B2

(45) Date of Patent: Jun. 9, 2009

(54) FLUID-DISPENSING RESERVOIR FOR LARGE-DIAMETER SLIP RINGS

(75) Inventors: Norris E. Lewis, Christianburg, VA (US); Barry K. Witherspoon, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 12/157,398

(22) Filed: Jun. 10, 2008

(65) Prior Publication Data

US 2008/0278025 A1 Nov. 13, 2008

Related U.S. Application Data

(63) Continuation of application No. 11/499,289, filed on Aug. 4, 2006, now Pat. No. 7,423,359, which is a continuation-in-part of application No. 10/871,090, filed on Jun. 18, 2004, now Pat. No. 7,105,983.

(51) Int. Cl.
*H02K 13/00* (2006.01)

(52) U.S. Cl. ........................ 310/248; 310/232; 310/242

(58) Field of Classification Search ......... 310/231–233, 310/238–239, 242, 251, 248
See application file for complete search history.

(56) References Cited

U.S. PATENT DOCUMENTS 2,269,614 A * 1/1942 von Soden
2,790,100 A * 4/1957 Caputo et al.
3,277,564 A * 10/1966 Webber et al.
3,648,088 A * 3/1972 Wilkin et al. ............... 310/178
3,668,451 A * 6/1972 McNab
3,821,024 A * 6/1974 Wilkin et al.
3,984,716 A * 10/1976 Stark
4,019,076 A * 4/1977 Bates
4,306,169 A * 12/1981 Diepers
4,349,760 A * 9/1982 Diepers ...................... 310/248
4,358,699 A * 11/1982 Wilsdorf ..................... 310/251
4,398,113 A * 8/1983 Lewis et al. ................. 310/232
4,415,635 A * 11/1983 Wilsdorf et al. ............. 428/611
4,562,368 A * 12/1985 Weldon et al.
5,220,481 A * 6/1993 Swift et al. ................. 361/225
5,354,607 A * 10/1994 Swift et al. ................. 310/251

(Continued)

*Primary Examiner*—Thanh Lam
(74) *Attorney, Agent, or Firm*—Phillips Lytle LLP

(57) ABSTRACT

The invention provides an improvement in a slip ring (20) adapted to provide electrical contact between a stator (21) and a rotor (22). The improvement includes: a current-carrying conductor (23) mounted on the stator; a brush tube (24) mounted on the conductor; a fiber bundle composed of a number of individual fibers(26), the upper marginal end portions of the fibers being received in said brush tube, a portion of the brush tube being crimped or swaged to hold the upper marginal end portions of said fibers therein, the lower ends of the fibers in the bundle extending beyond said brush tube and being adapted to engage said rotor; a collimator tube(25) integral with or surrounding a portion of the brush tube and extending therebeyond, the lower end of the collimator tube being adapted to limit lateral movement of the lower marginal end portions of said fibers in said bundle when the rotor rotates relative to said stator; and a fluid reservoir (28) mounted on the collimator tube. The fluid may be an lubricant, a corrosion inhibitor, a fluid having a high dielectric strength additive to prevent arcing, or some other fluid.

12 Claims, 1 Drawing Sheet

U.S. PATENT DOCUMENTS

| | | | |
|---|---|---|---|
| 6,800,981 B2 * | 10/2004 | Kuhlmann-Wilsdorf | 310/239 |
| 2005/0001468 A1 * | 1/2005 | Boucherie | 300/5 |
| 2005/0082936 A1 * | 4/2005 | Kuribayashi et al. | |
| 2007/0236095 A1 * | 10/2007 | Caiozza | |

* cited by examiner

FLUID-DISPENSING RESERVOIR FOR LARGE-DIAMETER SLIP RINGS

CROSS REFERENCE TO RELATED APPLICATIONS

The present application is a continuation of pending U.S. patent application Ser. No. 11/499,289, filed Aug. 4, 2006, now U.S. Pat. No. 7,423,359 which was a continuation-in-part of U.S. patent application Ser. No. 10/871,090, filed Jun. 18, 2004, now U.S. Pat. No. 7,105,983.

TECHNICAL FIELD

The present invention relates generally to slip rings for communicating electrical power and/or signal(s) between a rotor and stator, and, more particularly, to improvements in large-diameter slip rings that allow higher current densities, longer life, and higher rotor surface speeds to be achieved at lower costs then with conventional slip ring technology.

BACKGROUND ART

Electrical slip rings are used to transfer electrical power and/or signals between a rotor and a stator. These devices are used in many different military and commercial applications, such as solar array drive mechanisms, aircraft and missile guidance platforms, undersea robots, CATSCAN systems, and the like. In some of these applications, slip rings are used in conjunction with other rotary components, such as torque motors, resolvers and encoders. Electrical slip rings must be designed to be located either on the platform axis of rotation, or be designed with an open bore which locates the electrical contacts off-axis. Hence, the designations “on-axis” and “off-axis” slip rings, respectively. The diameter of slip ring rotors may range from a fraction of an inch to multiple feet, and the angular speed may vary from one revolution per day to as much as 20,000 revolutions per minute. In all of these applications, the electrical contacts between the rotor and stator must: (1) transfer power and/or signal(s) without interruption at high surface speeds, (2) have long wear life, (3) maintain low electrical noise, and (4) be of a physical size that allows multiple circuits to be packaged in a minimum volume.

The most efficient management of the electrical and mechanical contact physics allows the most demanding requirements to be met. For example, if the application is an off-axis slip ring that allows the x-ray tube in a CATSCAN gantry to rotate about the patient’s body, the electrical contacts must be designed to carry about 100-200 amps (with surges of hundreds of amps), operate at surface speeds on the order of 500 inches per second, last for 100 million revolutions, and occupy a minimal volume within the gantry. In order to meet the 100 million revolution requirement for a device that is about six feet in diameter, the brush force must be low to minimize frictional heating and to maintain a large number of contact points between brush and ring to achieve the required current density.

Four types of electrical contacts between a rotor and stator include: (1) a composite solid material brush on a cantilevered spring, (2) a monofilament metal alloy brush that tangentially engages the rotor, (3) a fiber brush having a plurality of individual fibers, with the bundle tangentially engaging the rotor, and (4) a tip-of-fiber contact between the brush and rotor. The contact force, surface speeds and type of lubrication for each contact type is summarized in Table 1. Table 1 also shows the types of lubricants heretofore typically required to reduce the contact frictional heating if the brush force is above one gram.

TABLE I

| Contact Type | Contact Force | Surface Speeds | Type of Lubrication |
|---|---|---|---|
| composite brush | 0.4 kg/cm$^2$ | 700 in/sec | sacrificial graphite film* |
| monofilament metal alloy | 3-20 grams | 12 in/sec | boundary lubrication** |
| tangential fiber brush | 1-3 grams | 200 in/sec | adventitious*** |
| fiber-on-tip | 0.1-1 grams | 1200 in/sec | adventitious*** |

*With a sacrificial graphite film, the brush and ring interface is lubricated by a film of graphite that is transferred from the brush to the ring. Material that is worn away is replaced by graphite from the brush.

**With boundary lubrication, a boundary lubricant film supports a portion of the load between the contact members. The points of metal contact support the remaining load between the contact members, and provide the current-carrying capability.

***With adventitious films, very thin films of materials that are capable of reducing the coefficient of friction between the contact members under light loads.

The tribological properties of electrical contacts and the right choice of lubricant to meet the requirements of the application are extremely important. For example, if the contacts are to be used in a space application, then the lubricant must meet all of the requirements of a ground-based application, and have a low vapor pressure. If the contacts have a long life requirement, then dust, wear debris and other contaminants may accumulate in the contact zone and create problems with life and signal transfer. However, if the electrical contact members can be brought together with a force of about one gram or less, then the lubricant and the associated complications are eliminated.

For several years, fiber brushes with a tangential orientation to the ring have been successfully used to meet high surface speeds without the use of a lubricant.

Under certain conditions, it may be desirable to provide lubrication during the initial brush run-in process. Moreover, the added fluid may be a lubricant, or a chemical vapor emitter, or an anti-corrosion inhibitor, or a material having a high dielectric strength to retard electrical arcing.

Accordingly, the principal object of the invention is to provide a fiber-on-tips brush with a fluid-dispensing reservoir for selectively dispensing a fluid, particularly during the brush run-in process.

DISCLOSURE OF THE INVENTION

With parenthetical reference to the corresponding parts, portions or surfaces of the disclosed embodiment, merely for purposes of illustration, and not by way of limitation, the present invention broadly provides an improvement in a slip ring (20) adapted to provide electrical contact between a stator (21) and a rotor (22). The improvement broadly comprises: a current-carrying conductor (23) mounted on the stator; a brush tube (24) mounted on the conductor; a fiber bundle composed of a number of individual fibers (26), the upper marginal end portions of the fibers being received in the brush tube, a portion of the brush tube being crimped or swaged to hold the upper marginal end portions of the fibers therein, the lower ends of the fibers in the bundle extending beyond the brush tube and being adapted to engage the rotor; a collimator tube (25) integral with or surrounding a portion of the brush tube and extending therebeyond, the lower end of the collimator tube being adapted to limit lateral movement of the lower marginal end portions of the fibers in the bundle when the rotor rotates relative to the stator; and a fluid reservoir (28) mounted on the collimator tube.

The reservoir may be mounted on the inside of the collimator tube, and may be concentric with the brush tube. The length of overlap of the collimator and brush tubes may be adjustable.

The reservoir may be formed of a porous material, such as nylon, a suitable cloth-filled phenolic, a porous graphite, a ceramic, a bearing bronze, etc. The reservoir may contain a fluid, and be arranged to dispense the fluid over a period of time. The fluid may be a lubricant, a corrosion inhibitor, a fluid having a high dielectric strength additive, or some other fluid.

These and other objects and advantages will become apparent from the foregoing and ongoing written specification, the drawings, and the appended claims.

DESCRIPTION OF THE PREFERRED EMBODIMENTS

Figure 1:
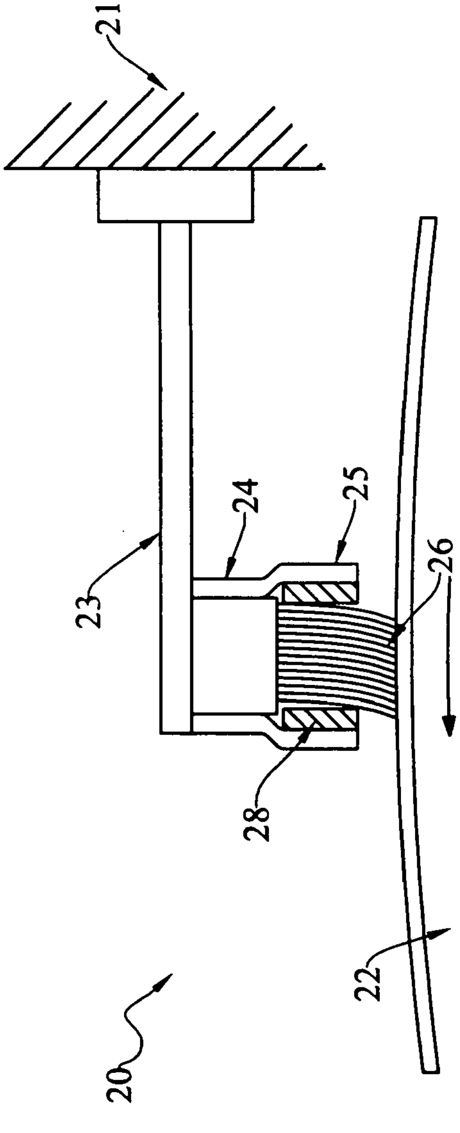
FIG. 1 is a schematic view of a first form of fiber-on-tips brush, incorporating a fluid reservoir within a fixed collimator, this view showing the rotor as rotating in a counter-clockwise direction.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention broadly provides an improved slip ring having a fluid-dispensing reservoir.

This general type of slip ring is disclosed in pending U.S. patent application Ser. No. 10/871,090, filed on Jun. 18, 2004, now U.S. Pat. No. 7,105,983, the aggregate disclosure of which is hereby incorporated by reference.

As best shown in FIG. 1, an improved brush, generally indicated at 20, is shown as being mounted on a stator 21, to engage a rotor 22, which is depicted as rotating in the counter-clockwise direction. More particularly, the improved brush has a arm 23 extending outwardly from the stator as a cantilever, and has a brush tube 24 depending from the distal of the arm. A collimator 25 extends downwardly from the brush tube 24. A fiber bundle, comprising a plurality of individual fibers, severally indicated at 26, is clamped, crimped or otherwise secured in the brush tube in the manner disclosed in said patent application Ser. No. 10/871,090. In FIG. 1, the brush tube 24 and collimator 25 are formed of a single tubular piece, suitably bent or otherwise deformed to the shape shown.

The improvement comprises an annular fluid reservoir, generally indicated at 28, that is mounted on the collimator tube beneath the brush tube, so as to surround an intermediate portion of the individual fibers.

This fluid reservoir may be formed of a suitable porous material, such as nylon. One possible form of such apparatus is sold under the trademark "Nylasint" by Polytron Kunststofftechnik GmbH & Co., KG, An der Zinkhutte 17, 51469 Bergisch Gladbach, Germany. "Nylasint" is generically referred to as a pressed or sintered article, both porous and nonporous, formed from filled or unfilled synthetic polymeric powders, in the form of synthetic polymeric powders. This porous material may be impregnated with a suitable fluid, such as a lubricant, a corrosion inhibitor, a fluid having a high dielectric strength additive to prevent arcing, or the like. Other types of materials, including (but not limited to) cloth-filled phenolics, porous graphites, ceramics and bearing bronzes, etc., might be substituted for "Nylasint". The size and shape of the fluid reservoir is considered to be a matter of design choice. In other words, the size and shape of the reservoir may be adjusted so as to dispense the fluid during the initial run-in period of the brush, or a longer period, as desired. If a lubricant is used, this can aid in the initial brush run-in process, and allows the brush face to wear in or become contoured to the shape of the rotor.

Figure 2:
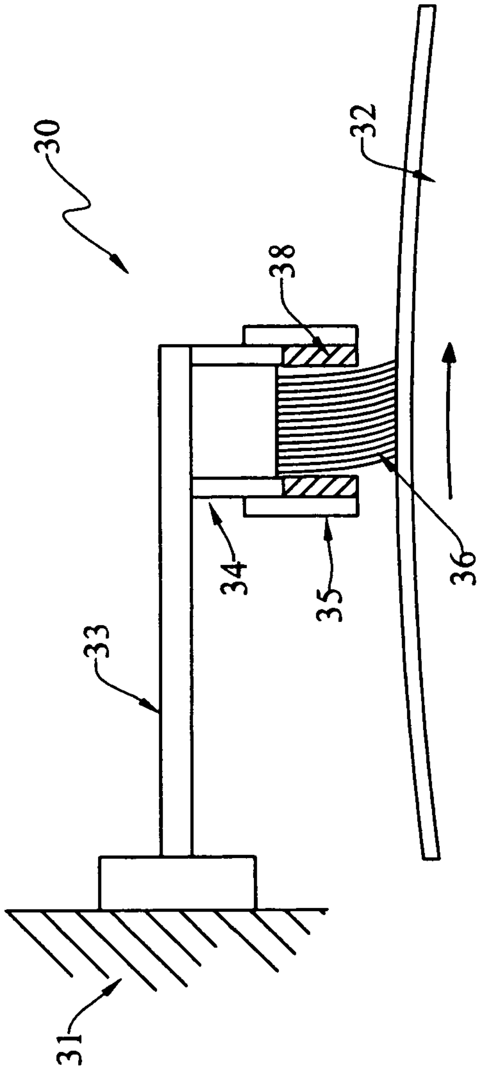
FIG. 2 is a schematic vertical sectional view of a second form of improved fiber-on-tips brush, this view showing the fluid reservoir as being located within a collimator which is adjustably mounted on the brush tube, this view showing the rotor as rotating in a clockwise direction.

FIG. 2 is a view of an alternative arrangement. In this form, the improved brush is generally indicated at 30. Brush 30 appears to be substantially a mirror image of brush 20, as discussed above. Brush 30 is shown as being mounted on a stator 31 and to engage a rotor 32. In FIG. 2, the rotor is depicted as rotating in a clockwise direction. The brush includes an arm 33 extending rightwardly from the stator. A brush tube 34 and a collimator 35 are supported on the rightward or distal marginal end portion of the arm. However, whereas the brush tube 24 and collimator 25 were formed integrally in FIG. 1, in FIG. 2, they are formed as separate members, such that the collimator tube overlaps the lower marginal end of the brush tube. More particularly, the extent of overlap of the collimator tube over the brush tube may be selectively adjusted in FIG. 2. A fiber bundle, containing a plurality of individual fibers, severally indicated at 36, is mounted in the brush tube. An annular reservoir 38 is mounted on the lower marginal end portion of the collimator tube. Here again, the particular size, shape and configuration of the reservoir may be varied to suit the particular application and need. As with the first form, reservoir 38 may be a porous material, such as Nylasint®, that is impregnated with a liquid lubricant. Alternatively, it may be impregnated with a suitable chemical so that it will emit a chemical vapor, will dispense a high dielectric strength additive to help prevent electrical arcing, or the like.

MODIFICATIONS

The present invention expressly contemplated that many modifications and changes may be made. For example, whereas the fluid reservoir is shown as being an annular cylindrical ring having a substantially rectangular cross-section, the reservoir could be formed in other shapes and configurations as well. While it is presently preferred that the reservoir be formed of a porous material, such as a porous nylon, the reservoir may be formed of other materials as well. The service fluid may be a lubricant, a source of chemical vapor, a fluid having a high dielectric strength to retard electrical arcing, or the like. The reservoir may be impregnated with other types of fluids as well. The size of the slip ring should not be regarded as being a limitation on the scope of the appended claims.

Therefore, while the present invention has been shown and described, and several modifications thereof discussed, persons skilled in this art will readily appreciate that various additional changes and modifications may be made, without departing from the spirit of the invention, as defined and differentiated by the following claims.

What is claimed is:

1. In a slip ring adapted to provide electrical contact between a stator and a rotor, the improvement comprising:

a current-carrying conductor mounted on said stator;

a brush tube mounted on said conductor; a fiber bundle composed of a number of individual fibers, the upper marginal end portions of said fibers being received in said brush tube, a portion of said brush tube being crimped or swaged to hold the upper marginal end portions of said fibers therein, the lower ends of the fibers in said bundle extending beyond said brush tube and being adapted to engage said rotor;

a collimator tube extending beyond said brush tube, the lower end of said collimator tube being adapted to limit lateral movement of the lower marginal end portions of said fibers in said bundle when said rotor rotates relative to said stator; and a fluid reservoir mounted on said collimator tube.

2. The improvement as set forth in claim 1 wherein said reservoir is mounted on the inside of said collimator tube.

3. The improvement as set forth in claim 2 wherein said collimator tube is concentric with said brush tube.

4. The improvement as set forth in claim 1 wherein said reservoir is formed of a porous material.

5. The improvement as set forth in claim 4 wherein said material is nylon.

6. The improvement as set forth in claim 1 wherein said reservoir contains a fluid, and wherein said reservoir is arranged to dispense said fluid over a period of time.

7. The improvement as set forth in claim 6 wherein said fluid includes a lubricant.

8. The improvement as set forth in claim 6 wherein said fluid includes a corrosion inhibitor.

9. The improvement as set forth in claim 6 wherein said fluid includes a high dielectric strength additive.

10. The improvement as set forth in claim 1 wherein said collimator tube is formed integrally with said brush tube.

11. The improvement as set forth in claim 1 wherein said collimator tube is formed separately from said brush tube, and wherein said collimator tube is overlapped with said brush tube.

12. The improvement as set forth in claim 11 wherein the length of overlap of said collimator and brush tubes is adjustable.

* * * * *